(12) United States Patent
Yoshida

(10) Patent No.: US 9,420,119 B2
(45) Date of Patent: Aug. 16, 2016

(54) METHOD AND APPARATUS FOR INSPECTING SCANNING BEAM OF SCANNING OPTICAL SYSTEM

(75) Inventor: Hiroki Yoshida, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 416 days.

(21) Appl. No.: 13/608,997

(22) Filed: Sep. 10, 2012

(65) Prior Publication Data

US 2013/0068927 A1 Mar. 21, 2013

(30) Foreign Application Priority Data

Sep. 16, 2011 (JP) .................................. 2011-203283

(51) Int. Cl.
| | | |
|---|---|---|
| *H01J 3/14* | (2006.01) | |
| *H04N 1/00* | (2006.01) | |
| *G01J 1/44* | (2006.01) | |
| *G01J 1/16* | (2006.01) | |

(52) U.S. Cl.
CPC .............. *H04N 1/00018* (2013.01); *G01J 1/16* (2013.01); *G01J 1/44* (2013.01); *G01J 2001/444* (2013.01)

(58) Field of Classification Search
CPC ......... G01J 1/44; G01J 1/16; G01J 2001/444; G01J 1/18; G01J 1/20; G01J 1/0448; G01J 1/0462; H04N 1/00002; H04N 1/00018; H04N 2201/047; H04N 2201/04729; H04N 2201/04753; H04N 2201/04; H04N 1/113; H04N 1/1135
USPC .............. 250/234, 201.1, 559.3, 201.2, 208.1, 250/559.29, 559.1, 235, 236, 214 R; 358/494, 474, 486, 487, 475, 481, 476, 358/480, 497; 347/225, 548, 250, 246, 236, 347/241, 247, 256, 260, 261; 359/202.1; 399/211
See application file for complete search history.

(56) References Cited

U.S. PATENT DOCUMENTS

| | | | |
|---|---|---|---|
| 6,275,249 B1 * | 8/2001 | Ozaki et al. .................... 347/236 |
| 6,704,093 B2 * | 3/2004 | Kurosawa ......................... 355/53 |
| 6,744,037 B2 * | 6/2004 | Yoshikawa et al. ........... 250/234 |

(Continued)

FOREIGN PATENT DOCUMENTS

| | | | | |
|---|---|---|---|---|
| JP | 01-312426 A | | 12/1989 | |
| JP | 06-102087 A | | 4/1994 | |
| JP | 2000-258297 A | | 9/2000 | |
| JP | 2000258297 A | * | 9/2000 | ............ G01M 11/00 |

(Continued)

*Primary Examiner* — Thanh Luu
*Assistant Examiner* — Jennifer Bennett
(74) *Attorney, Agent, or Firm* — Canon USA Inc. IP Division

(57) ABSTRACT

A scanning optical system manufacturing method includes receiving a scanning beam, emitted from a scanning unit including an incident optical system and a deflecting device and passed through an image-forming optical system, in an area having a width in the main scanning direction narrower than a spot diameter of the scanning beam by a light-receiving unit configured to be capable of being displaced at each image height position in the main scanning direction, calculating, based on an output of the light-receiving unit, a peak light quantity at each image height position of the scanning beam, smoothing distribution data of the peak light quantity at each of the image height position acquired by the calculating, and determining, based on the data acquired by the smoothing, either nondefective/defective states of the scanning unit and the image-forming optical system or a nondefective/defective state of only the image-forming optical system.

20 Claims, 15 Drawing Sheets

(56) References Cited

U.S. PATENT DOCUMENTS

| | | |
|---|---|---|
| 7,327,962 B2 * | 2/2008 | Shoji et al. .................. 399/9 |
| 2002/0043611 A1 | 4/2002 | Yoshikawa |
| 2003/0156184 A1 * | 8/2003 | Suzuki et al. ............. 347/249 |
| 2004/0016732 A1 * | 1/2004 | Liu et al. ................ 219/121.83 |
| 2005/0199814 A1 * | 9/2005 | Inoue et al. ................ 250/340 |

FOREIGN PATENT DOCUMENTS

| | | |
|---|---|---|
| JP | 2001-194230 A | 7/2001 |
| JP | 2002-086795 A | 3/2002 |
| JP | 2003-057581 A | 2/2003 |
| JP | 2003-240675 A | 8/2003 |
| JP | 2005-257495 A | 9/2005 |

* cited by examiner

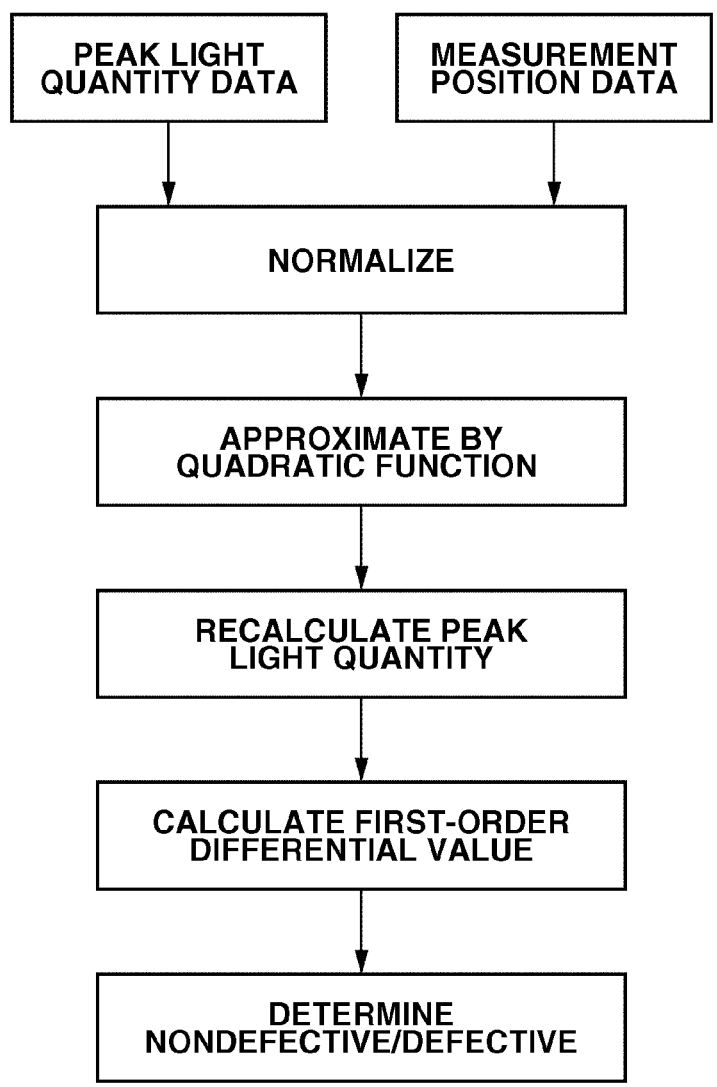

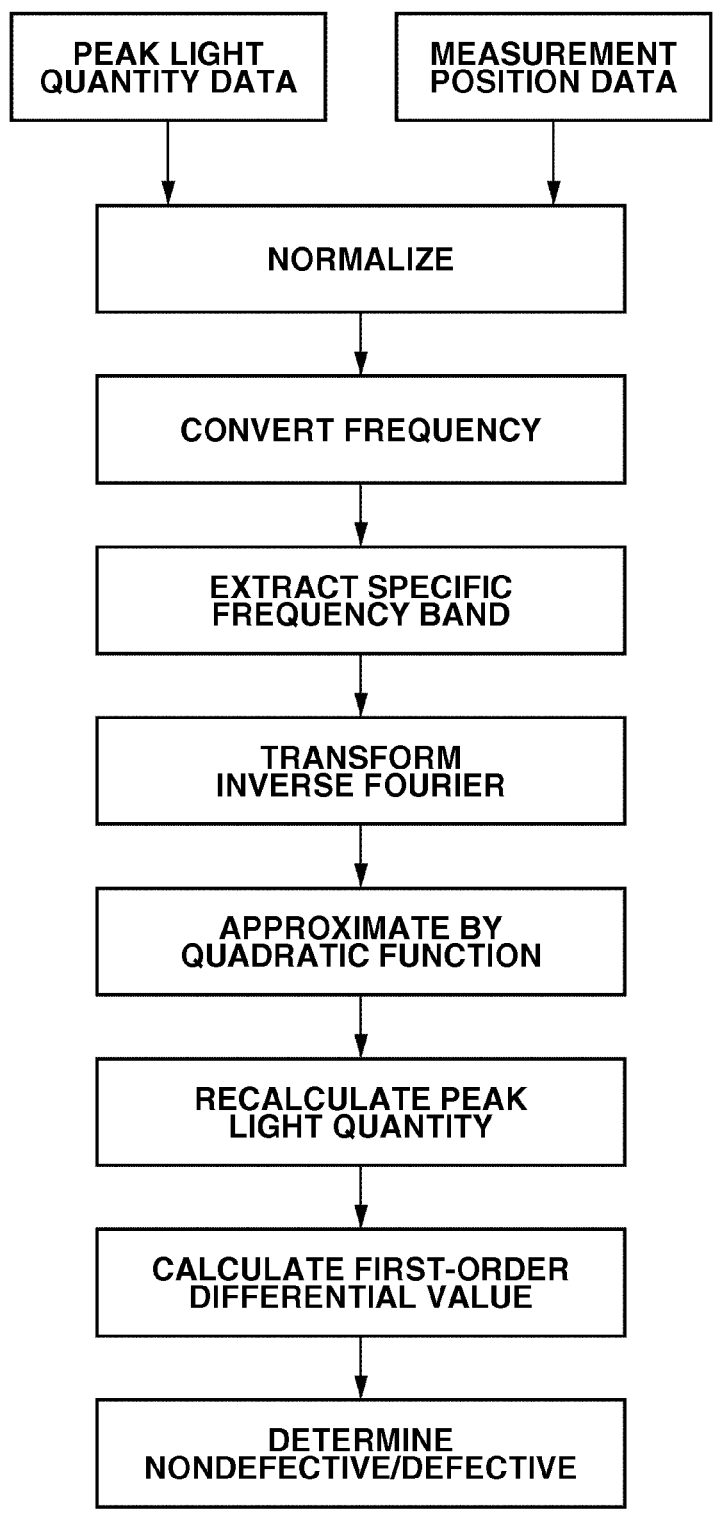

METHOD AND APPARATUS FOR INSPECTING SCANNING BEAM OF SCANNING OPTICAL SYSTEM

BACKGROUND OF THE INVENTION

1. Field of the Invention

The present invention relates to a scanning optical system manufacturing method, and a beam inspection method and an beam inspection apparatus.

2. Description of the Related Art

Conventionally, spot diameter measurement has been performed as a part of optical performance evaluation of an image-forming optical system or a scanning optical system including the image-forming optical system. Generally, since an enlarged spot diameter reduces a peak light quantity of a beam spot, a printed image has a tendency of providing a low density at an image height having an enlarged spot diameter. Since it is not possible to ship such a product that produces density unevenness remarkably degrading image quality, an image-forming optical system or a scanning optical system involving an large spot diameter, even if it is local, is disposed of or re-adjusted before an assembly stage of an image forming apparatus.

Japanese Patent Application Laid-Open No. 2002-086795 discusses a method for evaluating a spot diameter in which the light quantity distribution of a spot is analyzed while a two-dimensional area light-receiving sensor is moving in the scanning direction.

However, since a relation between the spot diameter and the image density is not linear, some printed images have no problem even if the spot diameter exceeds an inspection value, and other printed images have density unevenness even if the spot diameter does not exceed the inspection value. In a production site, just a nondefective/defective determination is more important than identifying a cause, and further an evaluation apparatus enabling shortening measurement time and simplifying apparatus configuration is required. On the other hand, the method for measuring a spot diameter has a problem that measurement takes time.

SUMMARY OF THE INVENTION

An example of the present invention is directed to providing a method for easily inspecting a scanning optical system by using an inspection apparatus having a simple configuration.

According to an aspect of the present invention, a scanning optical system manufacturing method includes receiving a scanning beam, emitted from a scanning unit including an incident optical system and a deflecting device and passed through an image-forming optical system, in an area having a width in the main scanning direction narrower than a spot diameter of the scanning beam by a light-receiving unit configured to be capable of being displaced at each image height position in the main scanning direction, calculating, based on an output of the light-receiving unit, a peak light quantity at each image height position of the scanning beam, smoothing distribution data of the peak light quantity at each image height position acquired by the calculating, and determining, based on the data acquired by the smoothing, either nondefective/defective states of the scanning unit and the image-forming optical system or a nondefective/defective state of only the image-forming optical system.

The inspection method according to examples of the present invention determines a nondefective/defective state of an entire scanning optical system or an image-forming optical system included in the scanning optical system based on a peak light quantity instead of a spot diameter.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a flowchart illustrating a second inspection method.

FIG. 13 is a flowchart illustrating a fifth inspection method.

DESCRIPTION OF THE EMBODIMENTS

Various exemplary embodiments, features, and aspects of the invention will be described in detail below with reference to the drawings.

Prior to descriptions of exemplary embodiments of the present invention, technical terms used in this specification will be predefined. In this specification, the term "main scanning direction" means a direction in which a light beam emitted from a scanning optical system is deflected for scanning, and the term "sub scanning direction" means a direction perpendicularly intersecting with the main scanning direction and with an optical axis direction of the scanning optical system. The term "image plane" means a flat surface on which image bearing members are arranged in a scanning optical apparatus using the scanning optical system. This term does not include the meaning of the curvature of the image plane.

In the present invention, the term "spot diameter" means a diameter of an area equal to or more than $1/e^2$ times the maximum value of a two-dimensional spot profile or a profile based thereon. The "spot diameter" includes a point spread function (PSF) spot diameter and a line spread function (LSF) spot diameter. The PSF spot diameter is defined as a diameter $1/e^2$ times the maximum value of the two-dimensional spot profile. The LSF spot diameter is defined as a diameter $1/e^2$ times the maximum value in a profile formed by product-sum operation of the two-dimensional spot profile in the main scanning or the sub scanning direction.

The term "peak light quantity" means an average of light quantity values close to the maximum light quantity (for example, an average of light quantity values which are 97% or more of the maximum light quantity) or the maximum light quantity. With the peak light quantity, the term "calculation" includes both performing extraction and performing operation.

Figure 1:
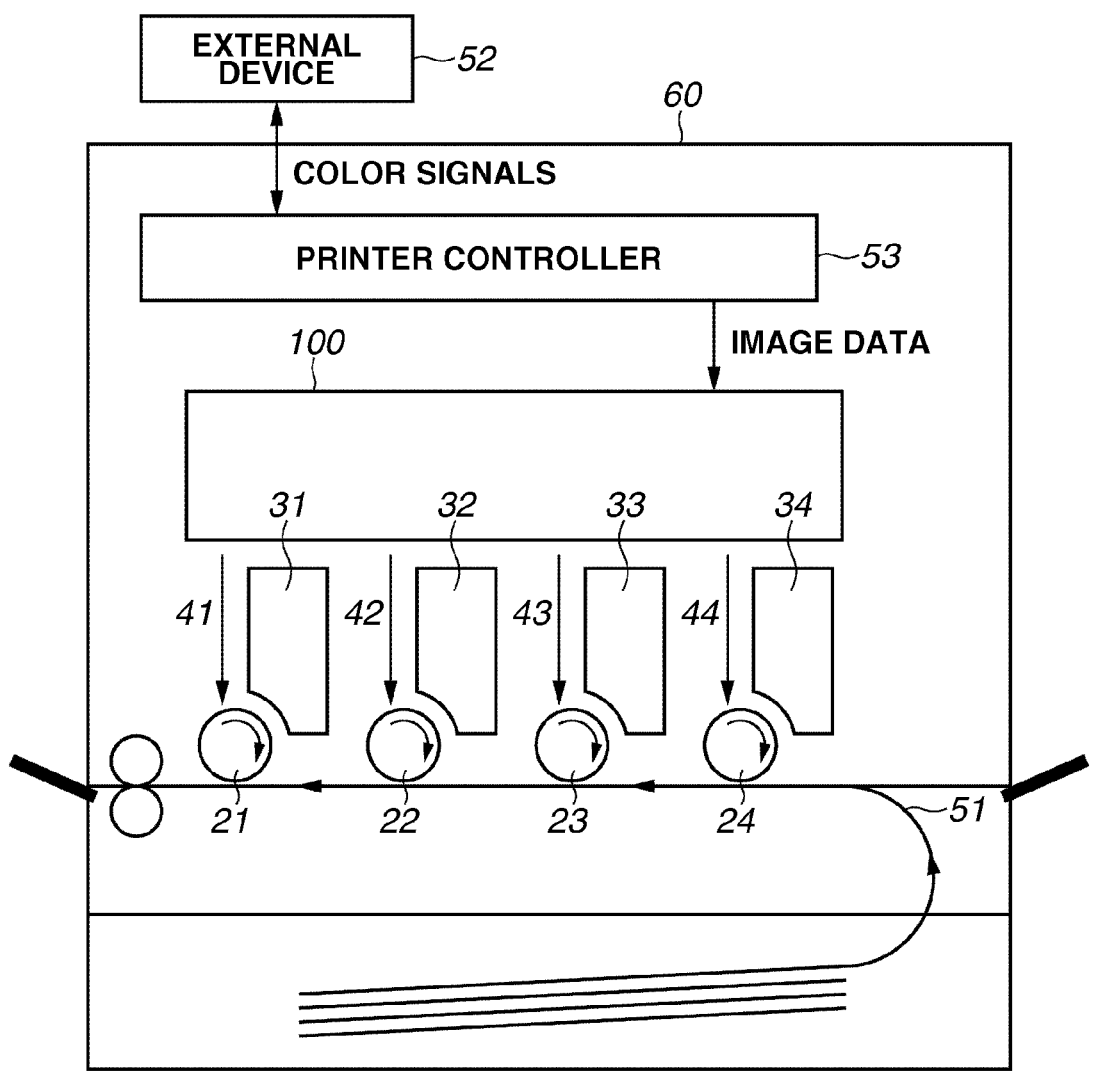
FIG. 1 schematically illustrates an essential part of a color image forming apparatus including a scanning optical system subjected to inspection.

A first exemplary embodiment will be described below. FIG. 1 schematically illustrates an essential part of a color image forming apparatus including the scanning optical system according to the present exemplary embodiment. More specifically, FIG. 1 is a tandem-type color image forming apparatus in which the scanning optical system emits four scanning beams to parallelly record image information onto photosensitive members (image bearing members). Referring to FIG. 1, a color image forming apparatus 60 includes a scanning optical apparatus 100 including a scanning optical system. The color image forming apparatus 60 further includes photoconductive drums 21, 22, 23, and 24 provided on a scanned plane as image bearing members for forming respective toner images of different colors, developing devices 31, 32, 33, and 34 for respective colors, and a conveyance belt 51 for conveying a recording material.

Referring to FIG. 1, red (R), green (G), and blue (B) color signals is input into the color image forming apparatus 60 from an external device 52 such as a personal computer. A printer controller 53 (for converting code data input from the external device 52 into image signals for beam scanning) converts the RGB color signals into yellow (Y), magenta (M), cyan (C), and black) (B) image data (dot data). The printer controller 53 supplies the image data to the scanning optical apparatus 100.

The scanning optical apparatus 100 emits light beams 41, 42, 43, and 44 (modulated with respective image data) for respectively scanning the photosensitive planes of the photoconductive drums 21, 22, 23, and 24 in the main scanning direction.

Referring to FIG. 1, the scanning optical apparatus 100 of the color image forming apparatus 60 emits four scanning beams respectively corresponding to Y, M, C, and B colors. Then, the scanning optical apparatus 100 records image signals (image information) on the surfaces of the photoconductive drums 21, 22, 23, and 24 in parallel with each other, and prints at high speed a color image formed by toner of respective colors.

Referring to FIG. 1, the scanning optical apparatus 100 of the color image forming apparatus 60 forms electrostatic latent images corresponding to respective colors on the surfaces of the photoconductive drums 21, 22, 23, and 24 by using light beams based on respective image data. The scanning optical apparatus 100 forms a full color image via transfer devices for transferring, in a superimposed way, toner images of respective colors onto a recording material (recording paper) and a fixing device for fixing a full color toner image onto the recording material.

The external device 52 may be a color image reading apparatus having, for example, a charge-coupled device (CCD) sensor. In this case, the color image reading apparatus and the color image forming apparatus 60 constitutes a color digital copier.

In the image forming apparatus 60, when charged photosensitive members are irradiated with light beams, potentials on the photosensitive members are lowered to form respective latent images. Then, color toner is applied to the latent images to develop respective toner images, and the toner images of respective colors are transferred onto print paper. Therefore, the scanning optical system is required to correctly form latent images. In particular, to prevent density unevenness in a printed image, the peak light quantity of a beam spot serves as a more important parameter than the total light quantity of the beam spot at the time of latent image formation.

Figure 2:
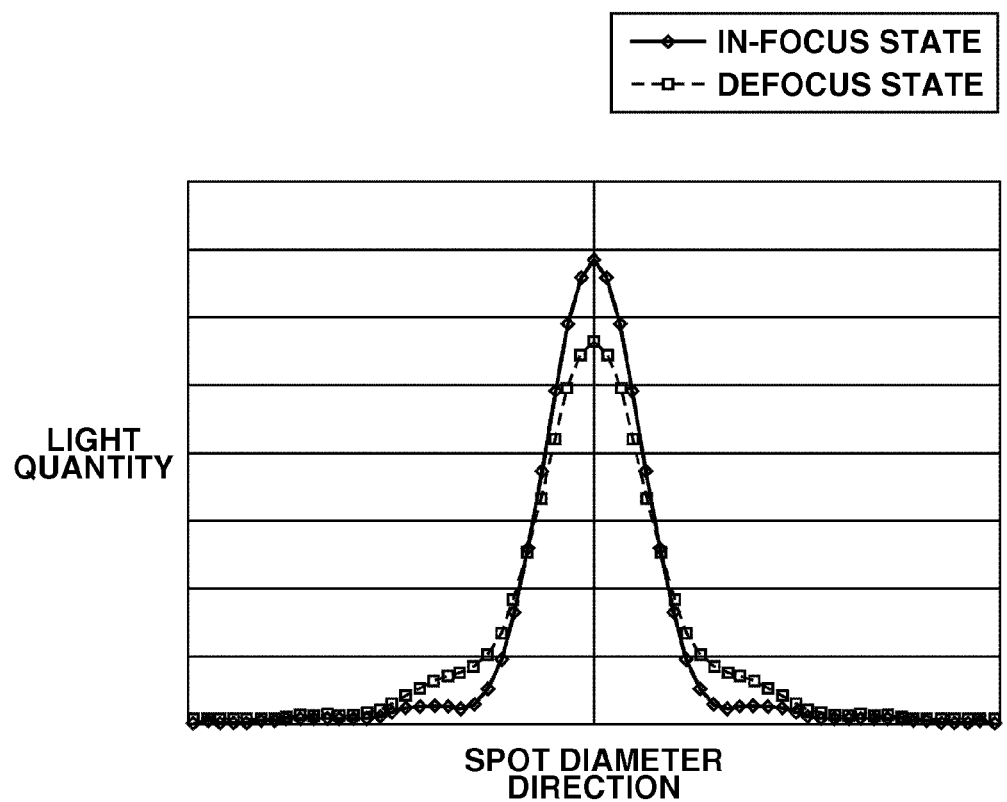
FIG. 2 illustrates a spot profile of the scanning optical system.

Suppose a case of the scanning optical system where, for example, the focus position largely shifts or the beam spot is distorted in shape. In this case, although the total light quantity of the beam spot remains unchanged, the spot profile provides a light quantity distribution having a shape of slightly squashed heap, as illustrated by the dotted line in FIG. 2. A solid line 1 in FIG. 2 indicates a spot profile in the original (in-focus) state, and a dotted line 2 indicates a spot profile in the out-of-focus (defocus) state. The horizontal axis is assigned to the coordinate of the spot diameter direction on the image plane, and the vertical axis is assigned to the light quantity. If the spot profile changes in shape in this way, the potential on each photosensitive member does not decrease much, making it impossible to correctly form a latent image or suitably developing a toner image.

An apparatus and a method for determining, based on the peak light quantity, a nondefective/defective state of the scanning optical system in the manufacture stage will be described in detail below.

Figure 3:
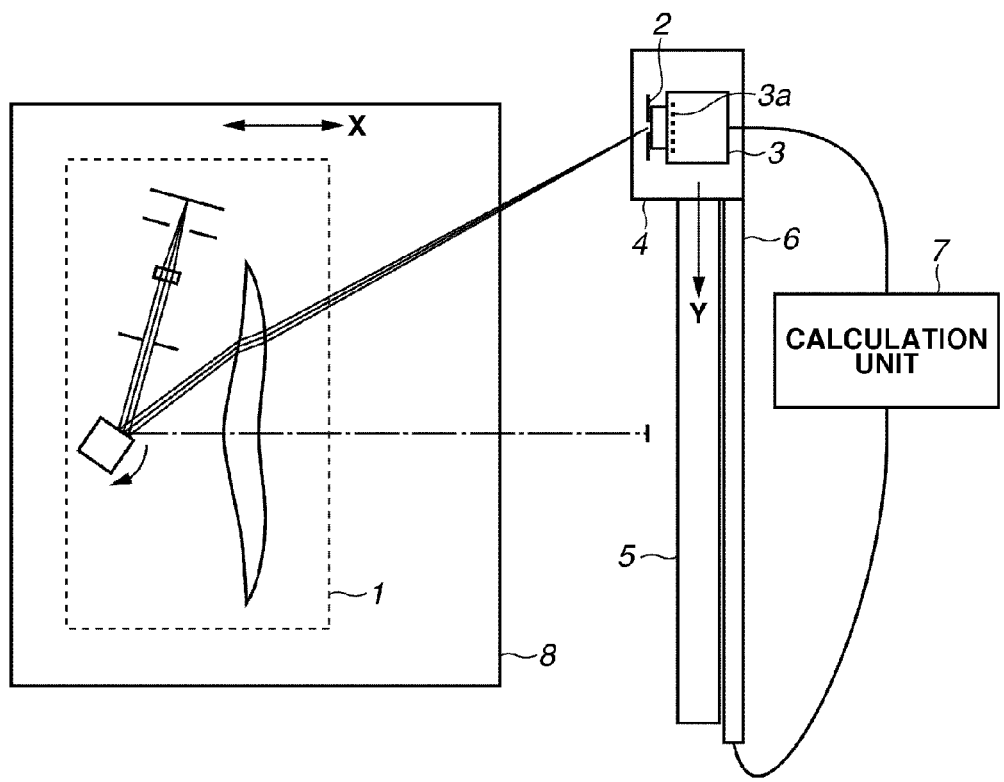
FIG. 3 is a cross sectional view illustrating an essential part of a beam inspection apparatus according to an exemplary embodiment of the present invention.

FIG. 3 schematically illustrates the beam inspection apparatus according to the present exemplary embodiment. Referring to FIG. 3, a scanning optical system 1 is a subject under inspection. The scanning optical system 1 performs spot scanning by using a rotating polygon mirror provided therein. The scanning optical system 1 according to the present exemplary embodiment includes a scanning unit including a polygon mirror as a deflecting device and an incident optical system for guiding a light beam from a light source to the polygon mirror, and an image-forming optical system (fθ lens) for guiding a light beam from the polygon mirror to an image plane (photoconductive drum surface). A supporting bench 8 for supporting the scanning optical system 1 is movable in the optical axis direction of the scanning optical system 1 (in the X direction illustrated in FIG. 3). With the scanning optical system 1, the image-forming optical system is built in the scanning unit in the manufacture stage and has not yet undergone a nondefective/defective determination. Therefore, the scanning optical system 1 is subjected to a nondefective/defective determination by using the beam inspection apparatus (described in detail below). If a defect is found, each member is replaced or adjusted to enable the scanning optical system 1 to be shipped as a product.

In the present exemplary embodiment, when determining a nondefective/defective state of the entire scanning optical system 1, a beam emitted from the image-forming optical system is inspected by using the beam inspection apparatus, with the image-forming optical system built into the scanning unit. Only the image-forming optical system included in the scanning optical system 1 may be a subject under inspection. In this case, with the image-forming optical system subjected to inspection temporarily built into the nondefective scanning unit, a beam emitted from the image-forming optical system is inspected by using the beam inspection apparatus to enable performing a nondefective/defective determination of the image-forming optical system. Then, the image-forming optical system determined to be a nondefective product is fixed to the scanning unit to enable assembling a scanning optical system as a product. The scanning optical system may be manufactured by fixing the image-forming optical system determined to be a nondefective product to a scanning unit different from the one used for a nondefective/defective determination. The image-forming optical system, as a subject under inspection, may be a single optical element or a unit composed of a plurality of optical elements.

The beam inspection apparatus according to the present exemplary embodiment includes a slit 2, a light-receiving sensor 3, a sensor stage 4, a slider 5, a stage position measurement unit 6, and a calculation unit 7. The slit 2 blocks a light beam emitted from the scanning optical system 1 so that only a part of the light beam enters the light-receiving sensor 3. The light-receiving sensor 3 receives light that has passed the slit 2 and outputs a signal according to the received light quantity. In the present exemplary embodiment, the slit 2 and the light-receiving sensor 3 constitute a light-receiving unit. The slit 2 is provided in close proximity to the surface of a light-receiving surface 3a of the light-receiving sensor 3 so that the light beam that passed the slit 2 does not deviate from the light-receiving surface 3a regardless of the incident angle of a light beam from the scanning optical system 1. The slit 2 and the light-receiving sensor 3 are mounted on the sensor stage 4. The slider 5 enables the sensor stage 4 to move in the main scanning direction (the Y direction illustrated in FIG. 3).

The stage position measurement unit 6 measures the position of the sensor stage 4 in the main scanning direction and outputs the position of the sensor stage 4 (corresponding to the image height position). The calculation unit 7 calculates the peak light amount based on a signal sent from the light-receiving sensor 3, and determines a nondefective/defective state of the scanning optical system 1 based on peak light quantities calculated at a plurality of image height positions, as described in detail below. The calculation unit 7 may be done using analog or digital processes. The calculation unit 7 may include a central processing unit.

In the present exemplary embodiment, the light beam emitted from the scanning optical system 1 fixed to the supporting bench 8 performs spot scanning in the main scanning direction (the Y direction illustrated in FIG. 3). On the other hand, the slider 5 moves the slit 2 and the light-receiving sensor 3 in the main scanning direction at a speed much lower than the scanning speed of the spot scanning. Specifically, the beam spot crosses the slit 2 at a certain time during one scan. A gap (light-receiving width) of the slit 2 in the main scanning direction according to the present exemplary embodiment is 8 µm which is narrower than the beam spot diameter (70 µm) in the main scanning direction. Therefore, while the beam spot is crossing the slit 2 at an image height position in the main scanning direction, only a part of the beam spot can pass the slit 2 at any time.

Therefore, the light-receiving sensor 3 outputs to the time axis a spot light quantity distribution folded (product-sum operated) in the sub scanning direction, i.e., a LSF spot profile. Based on the LSF spot profile output from the light-receiving sensor 3, the calculation unit 7 calculates (extracts or operates) a maximum light quantity in one scan at a predetermined image height position in the main scanning direction. In the present exemplary embodiment, the calculated maximum light quantity is recognized as the peak light quantity.

The present exemplary embodiment provides a wide measurement range of 250 mm which is wider than a 210 mm scanning width (printing area) of the scanning optical system 1. The slider 5 moves via the sensor stage 4 the light-receiving sensor 3 within this printing range in about 10 seconds. If the scanning optical system 1 scans 2000 times per second, the light-receiving sensor 3 outputs about as many as 20000 points of LSF spot profile data. In the present exemplary embodiment, since the amount of data is too much, the calculation unit 7 calculates the peak light quantity once every five scans. In this case, about 4000 points of peak light quantity data are acquired as extracted data.

Specifically, it is possible to acquire extracted data at intervals of as short as about 60 µm at the image height position in the main scanning direction, providing sufficient amount of data for measurement. Although, in the present exemplary embodiment, data is extracted as described above, average data may be calculated and applied. As a method for calculating a peak light quantity once every five scans, it is possible to process output data acquired in a time period for five scans after the light-receiving sensor 3 outputs data having a certain level or above. Alternatively, it is also possible to manage the number of times the light-receiving sensor 3 outputs data having a certain level or below after it outputs data having a certain level or above. Although the calculation interval is 5scans, it may be changed according to the required amount of data.

In the present exemplary embodiment, the slit 2 of the light-receiving unit is arranged not only at the original image plane position of the scanning optical system 1 but also at a plurality of positions shifted in the optical axis direction, and then beam inspection is performed. Specifically, the slit 2 is arranged at the image plane position and positions ±2 mm shifted in the optical axis direction with respect to the image plane position, and the stage 8 is moved. The slit 2 is arranged in this way to make it easier to detect a shift of the focus position due to a local abnormal shape on the optical surface of the image-forming optical system.

Figure 4:
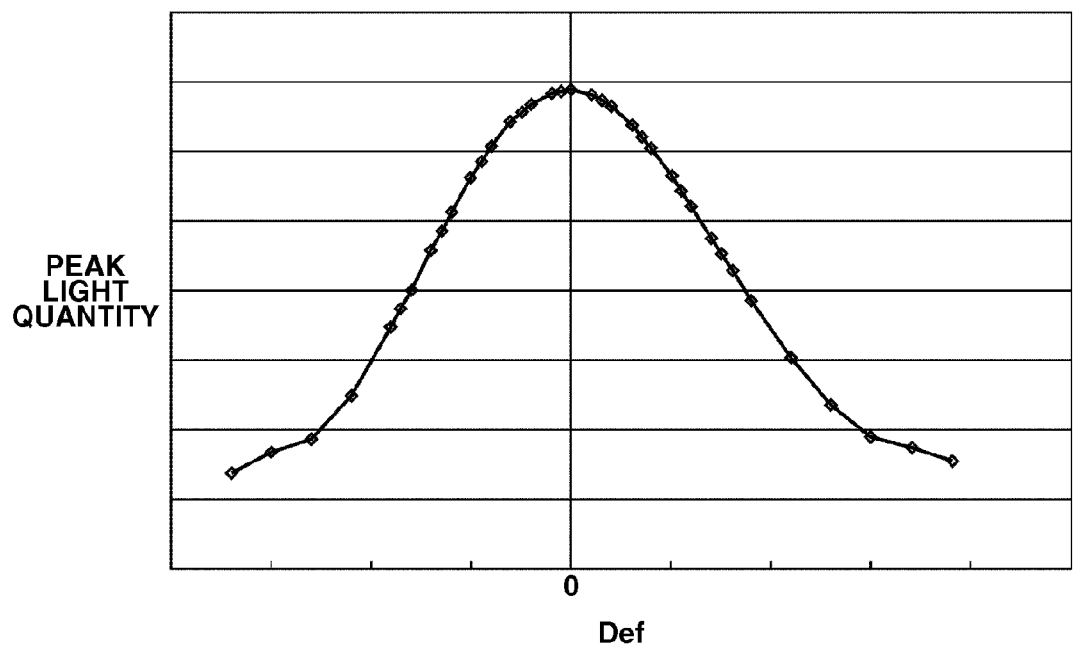
FIG. 4 illustrates peak light quantity variation with respect to defocusing.

Regularly, the peak light quantity of the scanning optical system 1 changes in the optical axis direction as illustrated in FIG. 4. Referring to FIG. 4, the horizontal axis indicates the position in the optical axis direction, with the original position of the image plane set to 0. The vertical axis indicates the peak light quantity. Referring to FIG. 4, the absolute value of the differential value of peak light quantity variation in close proximity to the image plane is smaller than the absolute value of the differential value of peak light quantity variation at a position shifted from the position in close proximity to the image plane, as a result of comparison of the two absolute values. Specifically, this means that, light quantity variation in case of focus movement measured at the original image plane position is smaller than that measured at a position shifted in the optical axis direction from the original position. Therefore, in the present exemplary embodiment, the slit 2 is arranged not only at the image plane position of the scanning optical system 1 but also at positions ±2 mm shifted from the image plane position, and then a peak light quantity is evaluated.

The focus position may be at an offset position due to a design-based curvature of image plane of the scanning optical system 1, or the focus position may be changed at an offset position as a result of local focus change, may change the focus position to the offset position. Taking this into consideration, it is desirable to measure light quantity variation in the optical axis direction at a plurality of positions as in the present exemplary embodiment. In this case, measurement points may include the image plane position as in the present exemplary embodiment. In calculating the peak light quantity, an unsuitable value may be calculated as a peak light quantity by being affected by a noise. To reduce such a noise effect, for example, an average of pieces of data which are 97% or more of the maximum light quantity may be handled as a peak light quantity.

The present exemplary embodiment performs a nondefective/defective determination of the scanning optical system 1 based on peak light quantity distribution data for a plurality of image height positions as described below. If any defect is found in the nondefective/defective determination, each member is replaced or adjusted to enable the scanning optical system 1 to be shipped as a product.

Figure 5:
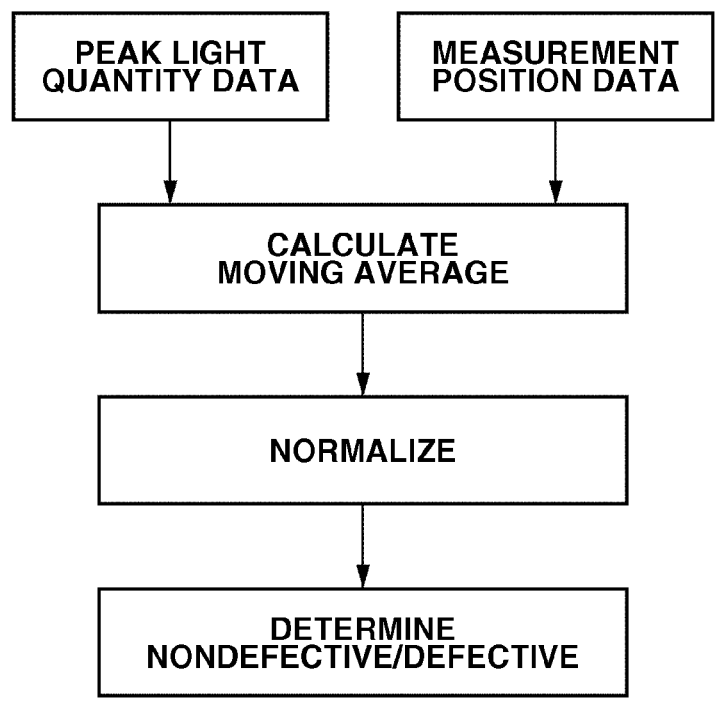
FIG. 5 is a flowchart illustrating a first inspection method.

A first nondefective/defective determination method will be described in detail below. FIG. 5 is a flowchart illustrating the present inspection method. The present inspection method calculates a peak light quantity (calculation processing) based on a signal sent from the light-receiving sensor 3 via the calculation unit 7. At the same time, based on information about stage position (image height position) sent from the stage position measurement unit 6, the present inspection method associates measurement points with the peak light quantity. If the position of the slit 2 is arranged so as to be shifted from the image plane, the measurement point differs from an actual print position and therefore coordinate conversion is performed.

Figure 6:
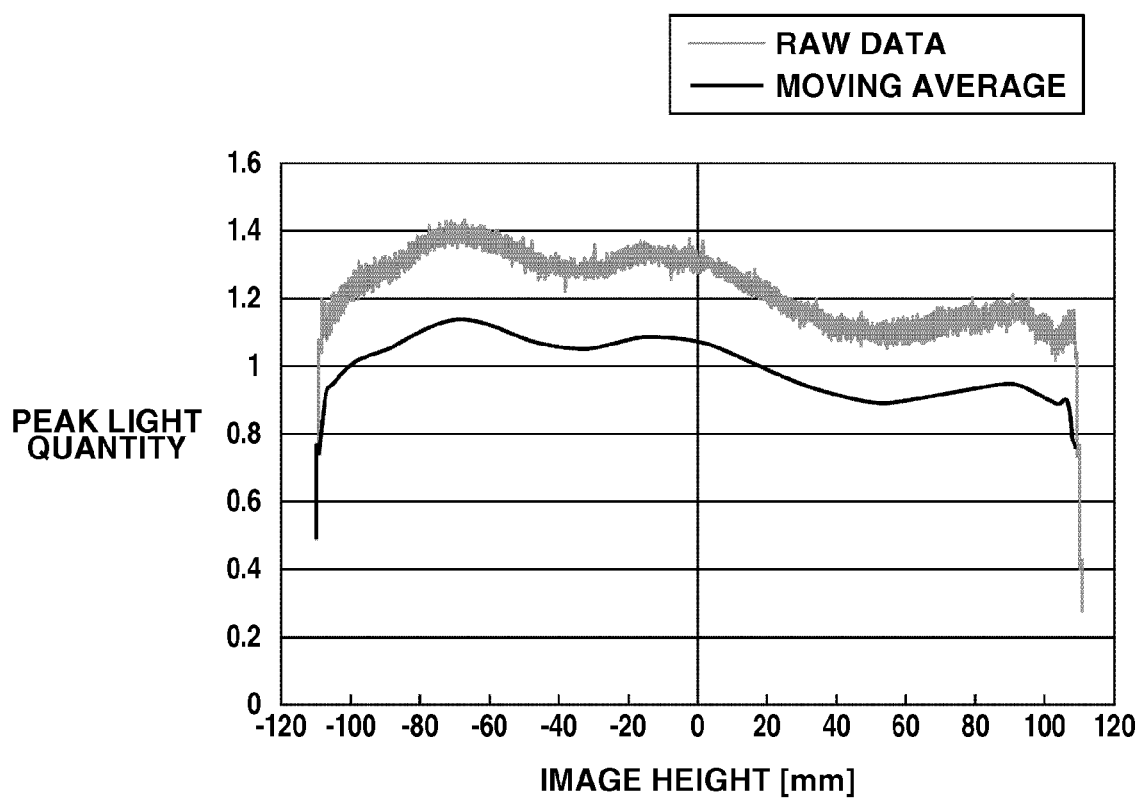
FIG. 6 illustrates a relation between a peak light quantity and each of an image height position in the first inspection method.

Raw data acquired in the calculation processing contains remarkably much noise, as illustrated by the upper graph in FIG. 6. With the raw data as it is, performing a nondefective/defective determination is difficult. Referring to FIG. 6, the horizontal axis indicates the image height position and the vertical axis indicates the peak light quantity. In the present inspection method, the following smoothing processing to raw data is performed by the calculation unit 7 to perform a nondefective product determination (inspection processing).

(1) Acquire a moving average for a 5 mm width for the peak light quantity distribution data (an average of each data in ±2.5 mm areas in the main scanning direction at all of the image height positions) to calculate the smoothed peak light quantity.

(2) Normalize the peak light quantity data acquired by the smoothing processing based on the moving average with respect to the average of data in the printing area before the smoothing processing. For example, when the raw data as illustrated in FIG. 6 is acquired, the normalized moving average is as illustrated by the lower graph in FIG. 6.

(3) Perform the inspection processing depending on the presence or absence of data out of a predetermined range in the normalized peak light quantity distribution. Specifically, a difference (peak to valley (PV) value) between the maximum and minimum values within ±2.5 mm areas in the main scanning direction at all of image height positions in the peak light quantity distribution is acquired, and a nondefective/defective inspection is performed depending on whether the maximum value of the PV value is within a predetermined range or exceeds the predetermined range. The smoothing processing and the standardization may be performed in reverse order.

The following complements the peak light quantity evaluation based on a 5 mm width when calculating the moving average in (1) above. In calculating a peak light quantity at a local position in the main scanning direction, if the evaluation width is too large, information about other positions is largely reflected, resulting in deviation from the original peak light quantity at a target position. Therefore, it is desirable to narrow the evaluation width in this sense. The present inspection method acquires a minimum scanning width with which light beam passing areas on the image-forming optical system are not overlapped with each other in the main scanning direction, and sets as an upper-limit evaluation width the distance between scanning positions on the image planes corresponding to the light beam passing areas.

If dust, crack, or local abnormal shape, and etc. exists on the optical surface of the image-forming optical system, and the relevant point is included in the light beam passing areas, the peak light quantity remains affected. Therefore, as described above, setting a fixed evaluation width enables the smoothing processing by using data in the light beam passing areas, so that data abnormality can be detected. Increasing the evaluation width exceeding the setting may dilute abnormality of the peak light quantity data, making it difficult to detect a defective point. In the present inspection method, a scanning light beam width is 2.2 mm on the optical surface of the image-forming optical system (fθ lens) toward the axial image height. While a width of 210 mm is scanned on the image plane, the light beam moves 70.2 mm on an fθ lens optical surface. Therefore, peak light quantity evaluation with 6.6 mm or below is required.

On the other hand, narrowing the evaluation area enables reducing the effect of other points. However, this process causes insufficient smoothing (smoothing is an intended purpose) and data indicating a defective point may be buried in noise. To reduce noise, it is advantageous that the smoothing processing is performed with an evaluation width which is equal to or larger than the period of noise components. However, because of the difficulty in estimating the period of noise components and the possibility of being affected by the measurement environment, it is desirable to provide an as large evaluation width as possible from the early stage. Accordingly, in the present inspection method, a lower limit is set to 3.3 mm which is a half of an upper limit of the evaluation width previously acquired, and a 5 mm evaluation width (approximate center of the upper and lower limits) is set to moving average.

The following complements the processing for normalizing the peak light quantity data acquired by the smoothing processing in (2) above. Although the light quantity on the image plane is different for each product, normalizing the peak light quantity enables evaluation of the light quantity based on the same criterion regardless of product models. Further, even if the light quantity adjustment is varies for each product, normalization is performed based on an average light quantity, enabling elimination of effects of variation in light quantity adjustment. An average data before smoothing processing is used to prevent effects of information outside the print position area which is included when data after smoothing processing is used.

Therefore, when normalizing the peak light quantity based on smoothed data for a certain reason, it is only necessary to calculate an average except for data of the end image height including the information outside the printing area. The present inspection method applies a 5 mm evaluation width for moving average. Therefore, to calculate an average based on data after smoothing processing, data of −102.5 mm to +102.5 mm may be used for −105 mm to +105 mm of the original printing area.

The following complements the inspection processing in (3) above in which a difference between the maximum and minimum values of the normalized peak light quantity in the printing area is acquired, and based on the acquired difference the inspection processing is performed. The normalized peak light quantity data illustrated in FIG. 6 indicates that a light quantity is 10% higher than the average peak light quantity at an image height position having the maximum value 1.1, and a light quantity is 10% lower than the average peak light quantity at an image height position having the minimum value 0.9. Since the peak light quantity and the image density are highly correlated, the image density varies according to the amount of the peak light quantity. Therefore, the inspection processing becomes possible by predetermining a permissible PV value (a difference between the maximum and minimum values) of the peak light quantity within a predetermined range.

The second inspection method will be described below. FIG. 7 is a flowchart illustrating the present inspection method. For elements equivalent or similar to those of the first inspection method, descriptions will be simplified or omitted. The present inspection method calculates a peak light quantity based on a signal sent from the light-receiving sensor 3 by the calculation unit 7. At the same time, based on stage positional information sent from the stage position measurement unit 6, the present inspection method associates measurement points with the peak light quantity. Similar to the first inspection method, raw data of the peak light quantity in this stage contains a lot of noise, as illustrated in FIG. 6. With the raw data as it is, performing the inspection processing is difficult. Accordingly, the present inspection method performs the following processing via the calculation unit 7.

(1) Normalize the peak light quantity based on an average light quantity. The average light quantity refers to an average value calculated based on measurement values in the printing area with respect to raw data immediately after measurement.

(2) Approximate the peak light quantity distribution data within the evaluation width (5 mm) at each of the image height positions by a quadratic function.

Figure 8A:
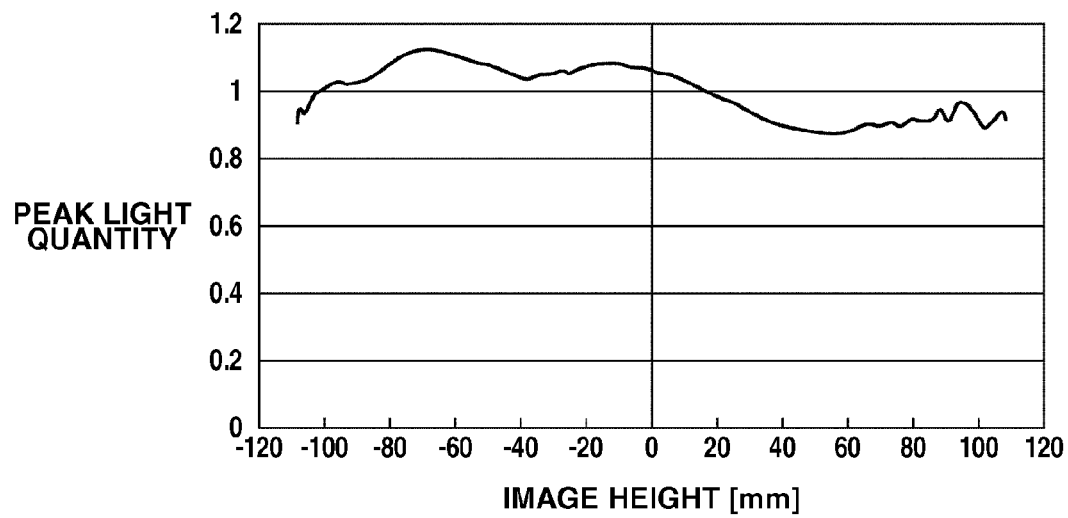
FIGS. 8A and 8B illustrate a relation between a peak light quantity and each of an image height position in the second inspection method.

Assign an average coordinate of the applied data group to the approximate quadratic function to calculate the smoothed peak light quantity as illustrated in FIG. 8A. The assignments of the vertical and horizontal axes illustrated in FIG. 8A are the same as those illustrated in FIG. 6.

(3) Assign the above-described average coordinate to a first-order differential function, derived by differentiating the above-described approximate quadratic function with respect to a measured coordinate, to calculate peak light quantity variation, and performs the inspection processing based on the result of the calculation.

Figure 8B:
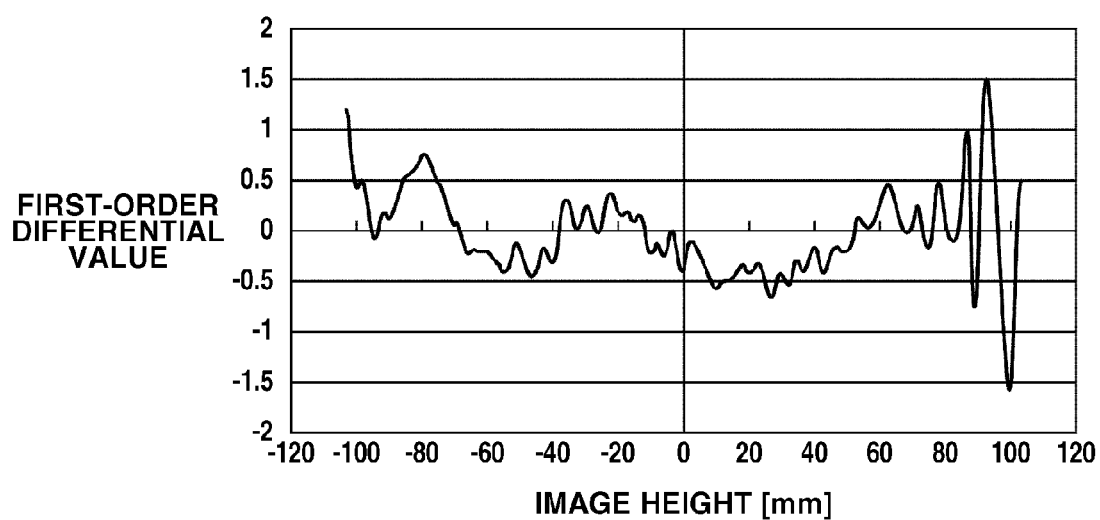

FIG. 8B illustrates peak light quantity variation calculated based on the data illustrated in FIG. 8A. The horizontal axis is assigned to the coordinate after conversion similar to FIG. 8A and the vertical axis is assigned to the first-order differential value. The reason of the normalization with an average light quantity, and the reason of the approximation value calculation with a 5 mm evaluation width are similar to those with the first valuation method.

The following complements the inspection processing by using peak light quantity variation in the inspection method. A printed image is likely to be recognized as a degraded image particularly when the image has local density unevenness. This is because the human unconsciously compares different printing densities in a narrow area, and feels it uncomfortable. Therefore, it is desirable to manage printing density variation.

However, to determine a nondefective/defective state of a product based on a print result, it is necessary to inspect the product in a complete state as a product. Therefore, it is desirable to inspect a scanning optical system and an image-forming optical system which may be a problem, on the upstream side of the manufacturing process. In this case, since the peak light quantity and the image density is highly correlated, the scanning optical system can be evaluated as a single unit by managing peak light quantity variation.

The following complements the approximation of the peak light quantity data by a quadratic function. The print quality can be determined by managing peak light quantity variation, as described above. The easiest way to achieve this is to give an approximate function an order enabling first order differentiation and then differentiate the approximation formula. Therefore, it is desirable to approximate data by a function having first order or higher order. The reason why a quadratic function is selected for the present inspection method will be described below. Approximating data by a linear function makes it difficult to suitably express a waveform of the peak light quantity resulting in an increase in approximation error. Approximating data by a function having third or higher order makes calculations susceptible to noise effect and actually noise-affected. Therefore, as long as the amount of noise is slight, data may be approximated by a function having third or higher order Although the present inspection method calculates the smoothed peak light quantity to enable checking a large light quantity variation, this process may be omitted if attention is to be focused only on peak light quantity variation in a short period, such as image streaks.

Figure 9:
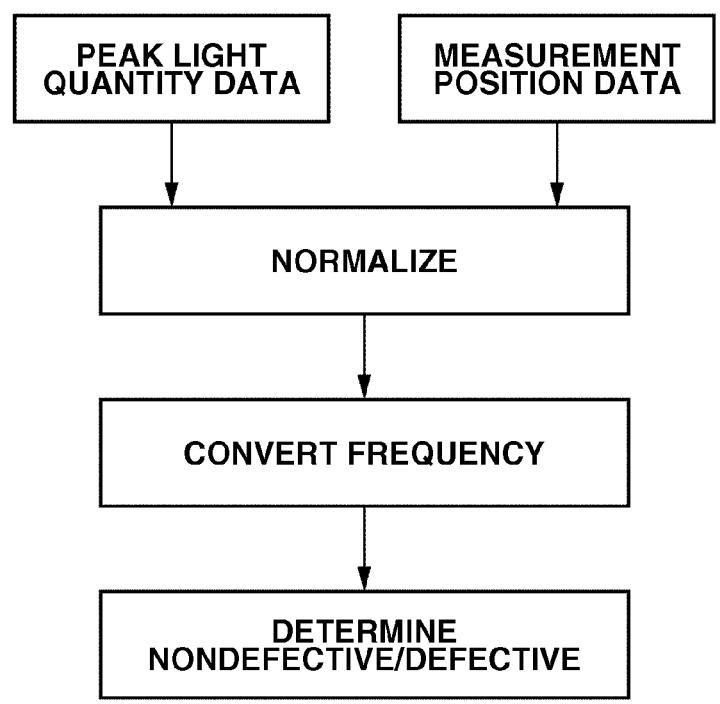
FIG. 9 is a flowchart illustrating a third inspection method.
Figure 10A:
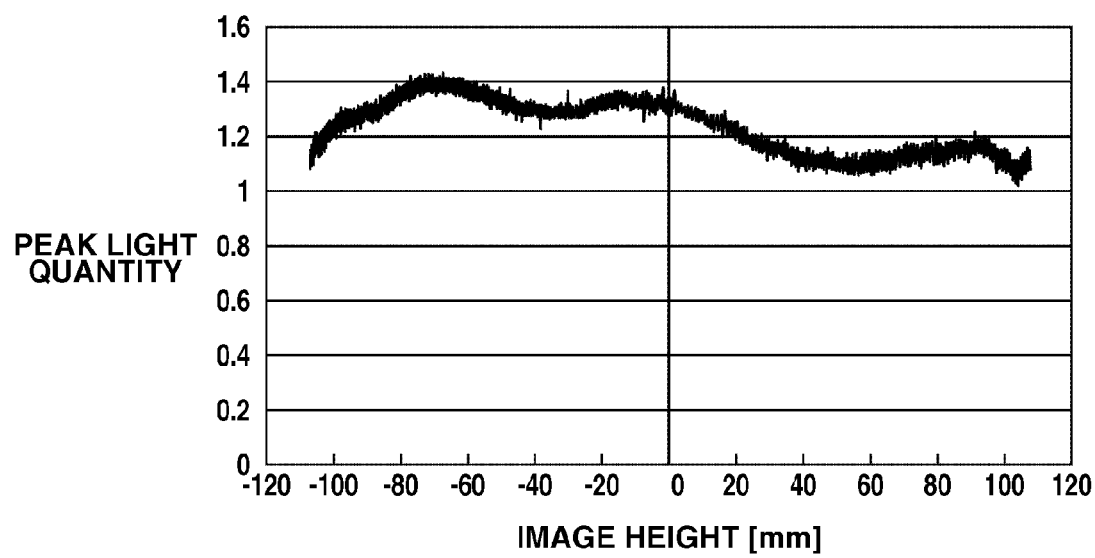
FIGS. 10A and 10B illustrate a relation between a peak light quantity and each of an image height position in the third inspection method.

A third inspection method will be described below. FIG. 9 is a flowchart illustrating the present inspection method. The present inspection method calculates a peak light quantity by the calculation unit 7 based on a signal sent from the light-receiving sensor 3. At the same time, based on stage positional information sent from the stage position measurement unit 6, the present inspection method associates image height position with the peak light quantity. However, data in this stage contains remarkably much noise, as illustrated in FIG. 10A. With the raw data as it is, performing the inspection processing is difficult. The assignments of the vertical and horizontal axes illustrated in FIG. 10A are the same as those illustrated in FIG. 6. Accordingly, the present inspection method performs the normalization by the calculation unit 7 based on the average light quantity, and applies frequency decomposition of the peak light quantity distribution data to achieve the smoothing processing.

Figure 10B:
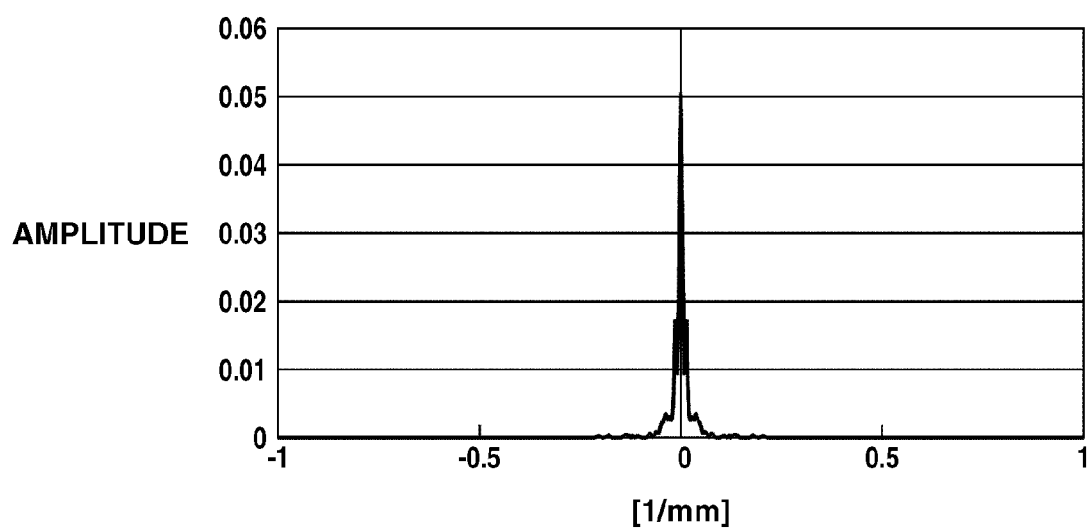

The ease of recognizing printing density unevenness is largely depends on the spatial frequency of density unevenness. For example, if the density changes at an extremely low frequency, density variation is not perceived. Conversely, if the density changes at a high frequency, the human eyes cannot perceive density unevenness because the density changes too finely. Accordingly, the present inspection method performs the normalization based on the average light quantity, and applies frequency decomposition to the peak light quantity distribution data, as illustrated in FIG. 10B. Then, the present inspection method applies a severe standard (for example, the standard of maximum amplitude) to a predetermined frequency band in which the human eyes easily perceive image streaks and applies an alleviated standard to a predetermined frequency band in which the perception is difficult. Referring to FIG. 10B, the horizontal axis is assigned to the spatial frequency [1/mm] and the vertical axis is assigned to the amplitude. A frequency band considered as a noise component is excluded from the range of the inspection processing, since the frequency band is difficult to be perceived.

Specifically, a spatial frequency band from 1/50 mm to 1/5 mm is a frequency band in which image streaks are easily recognized. Therefore, a product having an inspection value of 0.003 in the above-described frequency band is determined as a defective product, and inspection values are not provided for other frequency bands. The above-described inspection value 0.003 means that the light quantity varies by ±0.3% with respect to the average light quantity in one period. Although here the inspection value is 0.003, this value needs to be suitably changed if the relation between the density and the light quantity is sensitive. In an area close to the high or low frequency in the above-described frequency band, the perception becomes difficult, so that the inspection value may be gradually changed.

The average light quantity refers to an average value calculated based on measurement values in the printing area with respect to raw data immediately after measurement. The reason of the normalization with an average light quantity, and the reason of the approximation value calculation with a 5 mm evaluation width are similar to those with the first valuation method.

The present inspection method extends the moving range of the sensor stage 4 by 25 mm on both sides in the main scanning direction. The extension of the moving range will be described below. When the sensor stage 4 starts moving, it keeps accelerating until reaches a desired speed. In the area close to the movement end position, the sensor stage 4 keeps decelerating. Thus, the moving speed of the sensor stage 4 varies in the moving range. Since the light-receiving sensor 3 outputs measurement data each time the scanning light crosses the slit 2, irregular intervals of measurement points due to variation in moving speed of the sensor stage 4 become a problem. Although the fast Fourier transform (FFT) method is known as a method for processing frequency decomposition most easily at high speed, it is necessary to arrange data at equal intervals with respect to the measurement coordinate to perform the FFT processing.

Therefore, to use this method, it is desirable to move the sensor stage 4 at a constant speed. Consequently, to prevent an area where the moving speed of the sensor stage 4 varies from overlapping with an area required for data processing, the present inspection method extends the moving range of the sensor stage 4.

Figure 11:
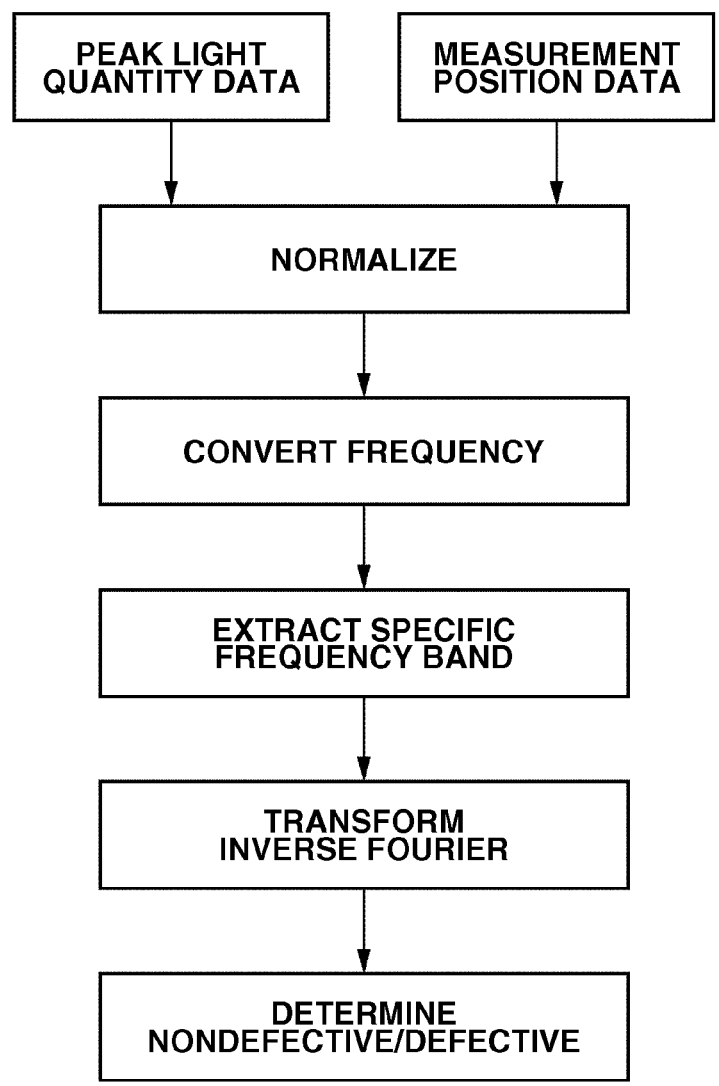
FIG. 11 is a flowchart illustrating a fourth inspection method.
Figure 12A:
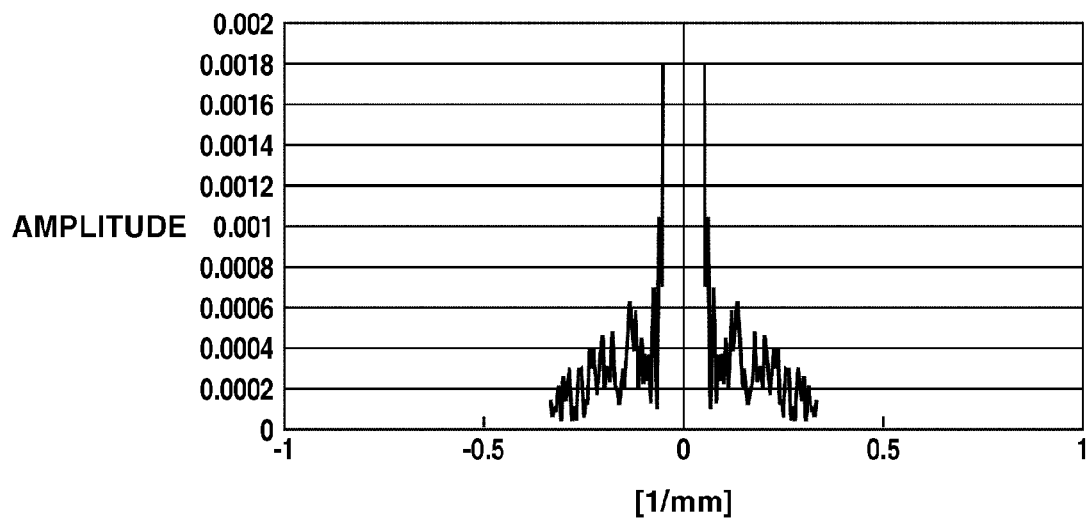
FIGS. 12A and 12B illustrate a relation between a peak light quantity and each of an image height position in the fourth inspection method.
Figure 12B:
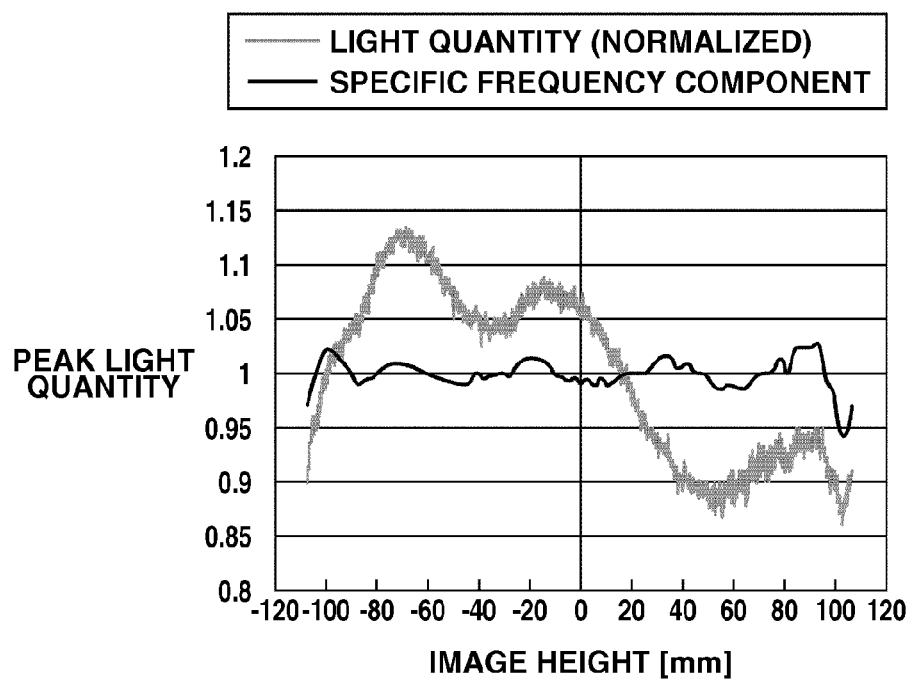

A fourth inspection method will be described below. FIG. 11 is a flowchart illustrating the present inspection method. The present inspection method performs similar processing to the inspection method 3 up to the frequency decomposition of the peak light quantity distribution data, and duplicated descriptions will be omitted. The present inspection method applies the inverse Fourier transform only to components of the frequency band from 1/50 mm to 1/5 mm in which image streaks are easily recognized (refer to FIG. 12). Then, a product having a PV value (difference between the maximum and minimum values) exceeding 0.03 in a fixed evaluation width (5 mm) at each of the image height positions with respect to the inverse-Fourier transformed data from which noise has been eliminated is determined as a defective product. This process enables elimination of not only noise in data but also the effect due to long-period image density variation, and solely observation of the effect of only a frequency band in which image streaks are easily recognized.

The evaluation width is set to 5 mm to provide the same period as the period of the maximum frequency 1/5 mm of the frequency band in which image streaks are easily recognized. Since image streaks are easily recognized in the frequency band from 1/50 mm to 1/5 mm, it is desirable to perform evaluation with an evaluation width from 5 mm to 50 mm. Further, within the above-described range, the larger the image density varies in a narrow range, the easier becomes the perception of image streaks. Therefore, a 5 mm evaluation width providing the shortest period out of the above-described ranges is applied.

A fifth inspection method will be described below. FIG. 13 is a flowchart illustrating the present inspection method. The present inspection method performs similar processing to the inspection method 4 up to the inverse Fourier transform, and duplicated descriptions will be omitted. In addition to the frequency decomposition, the present inspection method applies the smoothing processing to the inverse-Fourier transformed data by approximating the peak light quantity distribution data within a fixed evaluation width (5 mm) at each of the image height positions by a quadratic function. Specifically, similar to the second inspection method, the present inspection method assigns the average coordinate of the data group to the approximate quadratic function to calculate the smoothed peak light quantity. Further, the present inspection method assigns the above-described average coordinate to a first-order differential function, derived by differentiating the above-described approximated quadratic function with respect to a measured coordinate, to calculate peak light quantity variation. The inspection processing is performed based on the result of the calculation.

This process enables extraction of only components required for inspection, and evaluating the peak light quantity variation enables certainly acquisition of a point which is easily recognized as density unevenness.

Figure 14:
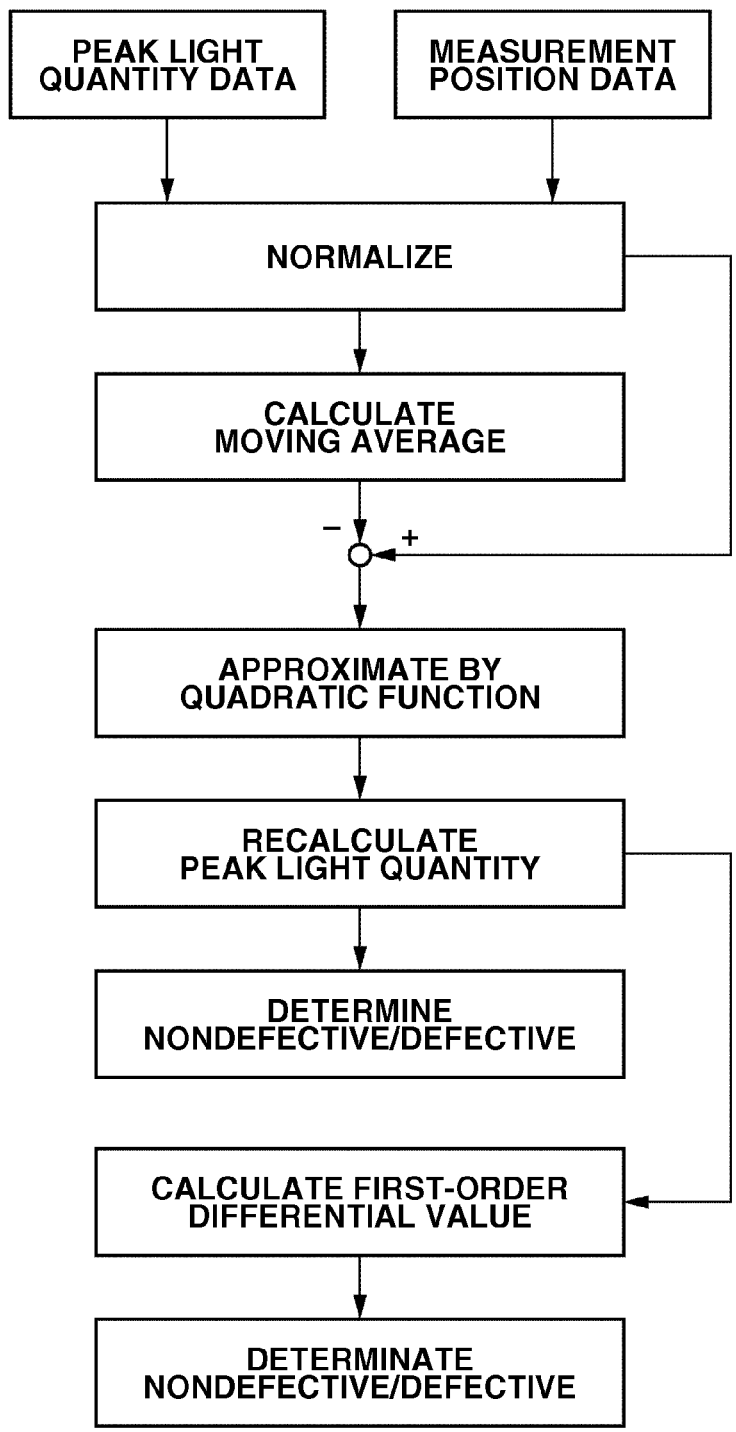
FIG. 14 is a flowchart illustrating a sixth inspection method.

A sixth inspection method will be described below. FIG. 14 is a flowchart illustrating the present inspection method. The present inspection method calculates a peak light quantity by the calculation unit 7 based on a signal sent from the light-receiving sensor 3. At the same time, based on stage positional information sent from the stage position measurement unit 6, the present inspection method associates image height position with the peak light quantity. However, since the peak light quantity distribution data in this stage contains much noise, as illustrated in FIG. 6, performing the inspection processing is difficult with the data as it is. Therefore, the present inspection method performs the following processing.

(1) Normalize the peak light quantity with an average light quantity.

(2) Acquire a moving average for a 20 mm width.

(3) Subtract the value of the moving average with 20 mm from the data immediately after normalization with the average light quantity.

(4) Approximate the data by a quadratic function with a fixed evaluation width at each of the image height positions (5 mm).

Figure 15A:
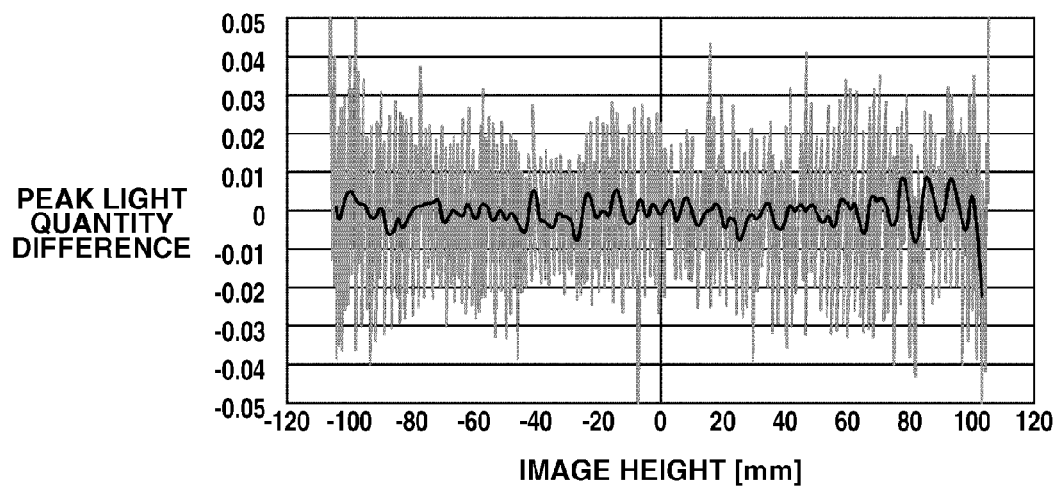
FIGS. 15A and 15B illustrate a relation between a peak light quantity and each of an image height position in the sixth inspection method.

Then, the present inspection method assigns the average coordinate of the data group to the approximate quadratic function to calculate the smoothed peak light quantity, as illustrated by the solid line in FIG. 15A.

(5) Based on this result, the present inspection method acquires a PV value (difference between the maximum and minimum values) within the 5 mm width in the main scanning direction at all of image height positions in the main scanning direction. The inspection processing is performed depending on whether the maximum value of the difference (PV value) is within a predetermined range or exceeds the predetermined range.

Figure 15B:
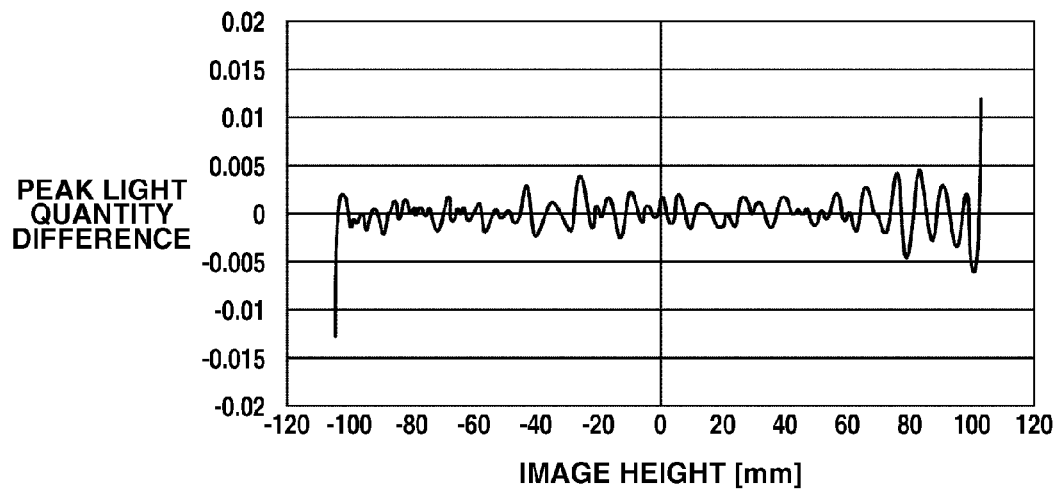

Of course, it is also possible to assign the above-described average coordinate to a first-order differential function, derived by differentiating the data approximated by a quadratic function with respect to a measured coordinate, to calculate peak light quantity variation, and perform the inspection processing based on the result of the calculation (see FIG. 15B).

The reason of acquiring a moving average for a 20 mm width in (2) above is that light quantity unevenness components having a spatial frequency with a period of 20 mm or below cannot exist in the moving average for a 20 mm width.

Therefore, subtracting the moving average for a 20 mm width from the data immediately after normalization enables extraction of only light quantity unevenness components having a spatial frequency with a period of 20 mm or below. However, since the frequency band in which image streaks are easily recognized is the 1/50 mm to 1/5 mm component, it is originally useful to extract light quantity unevenness components having a spatial frequency with a period of 50 mm or below.

However, to actually acquire a moving average for a 50 mm width, an additional 25 mm is required as a measurement width on both sides of the area to be finally evaluated. It is rare that a light beam passes through the additional areas. Even if a light beam passes through the additional areas, the peak light quantity is expected to be decreased because of degraded optical performance of the scanning optical system. Therefore, the use of such a moving average for a 50mm width is not useful. On the other hand, to avoid an area having degraded optical performance in evaluation, the evaluable area is narrowed and accordingly the impossibility of evaluating the ends of the area is concerned.

On the other hand, in the case of moving average for a 20 mm width, it is only necessary to extend both sides of the area to be finally evaluated by 10 mm. With this extension, the image quality is not almost affected by optical performance degradation. Even if the image quality is affected by optical performance degradation, the reduction of the evaluation area can be minimized. However, with the above-described method, noise components have not yet been eliminated and therefore the smoothing processing needs to be performed. Accordingly, the present inspection method approximates data by a quadratic function with a fixed evaluation width (5 mm) at each of the image height positions. The reason of having approximated data by a quadratic function with a 5 mm evaluation width is similar to that with the second inspection method, and duplicated descriptions will be omitted.

The present inspection method subtracts the moving average for a 20 mm width from the data immediately after standardization to eliminate low-frequency components, and approximates data by a quadratic function with a fixed evaluation width at each of the image height positions to eliminate high-frequency components containing noise. Thus, directly evaluating the peak light quantity or evaluating the peak light quantity variation enables extraction of components easily recognized as image streaks.

A second exemplary embodiment will be described below. Similar to the first exemplary embodiment, the present exemplary embodiment performs the inspection processing for the scanning optical system 1. Elements similar or equivalent to those in the first exemplary embodiment are assigned to the same reference numerals, so that descriptions will be simplified or omitted. The beam inspection apparatus according to the present exemplary embodiment differs from the beam inspection apparatus according to the first exemplary embodiment in the following points.

(1) Measure the LSF spot diameter in the main scanning direction and the sub scanning direction.

(2) Arrange a line CCD oblong in the sub scanning direction in close proximity to the light-receiving sensor 3 to measure the LSF spot diameter in the sub scanning directions.

(3) Take into consideration not only the LSF peak light quantity but also the LSF spot diameter in the inspection processing.

Similar to the first exemplary embodiment, the light-receiving sensor 3 outputs the spot light quantity distribution folded in the sub scanning direction, i.e., the LSF spot profile to the time axis. The calculation unit 7 extracts a maximum value in one scan from the LSF spot profile output from the light-receiving sensor 3, and recognizes the maximum value as a peak light quantity. In the present exemplary embodiment, the beam inspection apparatus measures a time interval at which a light quantity $1/e^2$ times the peak light quantity or more is acquired, based on the LSF spot profile. Then, the calculation unit 7 multiplies the measured time interval by the scanning speed of the beam spot emitted from the scanning optical system 1 to calculate the spot diameter in the main scanning direction.

As for the spot diameter in the sub scanning direction, a line CCD oblong in the sub scanning direction is arranged in close proximity to the light-receiving sensor 3 and used for measurement. Since the time during which the beam spot crosses the line CCD is shorter than the storage time of the line CCD, the line CCD outputs data so that the spot light quantity distribution folded in the main scanning direction, i.e., the LSF spot profile, is output to the position coordinate axis. The calculation unit 7 further acquires a width of the image height at which a light quantity $1/e^2$ times the peak light quantity or more is acquired, based on the above-described LSF spot profile, to calculate the sub scanning spot diameter.

The present exemplary embodiment performs the inspection processing based on the spot diameter data when the slit 2 is positioned at the image plane position. However, the line CCD outputs data even if the slit 2 is arranged in a shifted way. The output data, if a defective inspection result is acquired, can be used to determine which direction the focus position is shifted in.

In the present exemplary embodiment which performs a nondefective/defective determination of the scanning optical system 1 based on peak light quantity data and the spot diameter, if a defective inspection result is acquired, the calculation unit 7 outputs the peak light quantity and the LSF spot diameter at each image height position.

A modification will be described below. Although, in the above-described exemplary embodiments, the LSF spot diameter is used as a spot diameter, the PSF spot diameter may be used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-203283 filed Sep. 16, 2011, which is hereby incorporated by reference herein in its entirety.

What is claimed is:

1. A scanning optical system manufacturing method comprising:

receiving a scanning beam, emitted from a scanning unit including an incident optical system and a deflecting device and passed through an image-forming optical system, in an area having a light-receiving width in a main scanning direction narrower than a spot diameter of the scanning beam by a light-receiving unit configured to be capable of being displaced at each image height position in the main scanning direction;

calculating, based on an output of the light-receiving unit, a peak light quantity at each image height position of the scanning beam;

smoothing, using an evaluation width in the main scanning direction, distribution data of the peak light quantity at each image height position acquired by the calculating; and determining, based on the data acquired by the smoothing, either nondefective/defective states of the scanning unit and the image-forming optical system or a nondefective/defective state of only the image-forming optical system, wherein the evaluation width is equal to or less than a shift amount of the scanning beam on an image surface of the image-forming optical system in the main scanning direction when the scanning beam from the deflecting device shifted as much as a width of the scanning beam at an optical surface of the image-forming optical system in the main scanning direction.

2. The scanning optical system manufacturing method according to claim 1, wherein the smoothing with respect to each evaluation width in the main scanning direction includes acquiring a moving average of the distribution data of the peak light quantity.

3. The scanning optical system manufacturing method according to claim 1, wherein the smoothing includes approximating the distribution data of the peak light quantity by a function having a second or higher order with the evaluation width at each of the image height position.

4. The scanning optical system manufacturing method according to claim 1, wherein the determining differentiates the data acquired by the smoothing to acquire peak light quantity variation at each of the image height positions, and determines, based on the peak light quantity variation, either nondefective/defective states of the scanning unit and the image-forming optical system or a nondefective/defective state of only the image-forming optical system.

5. The scanning optical system manufacturing method according to claim 1, wherein the determining provides a maximum amplitude standard for the data acquired by the smoothing, and determines, based on the maximum amplitude standard, either nondefective/defective states of the scanning unit and the image-forming optical system or a nondefective/defective state of only the image-forming optical system.

6. The scanning optical system manufacturing method according to claim 1, wherein the determining determines, based on whether data exists out of a predetermined range in the data acquired by the smoothing, either nondefective/defective states of the scanning unit and the image-forming optical system or a nondefective/defective state of only the image-forming optical system.

7. The scanning optical system manufacturing method according to claim 1, wherein the determining determines, based on whether a difference between maximum and minimum values with the evaluation width at each of the image height position is included in a predetermined range in the data acquired by the smoothing, either nondefective/defective states of the scanning unit and the image-forming optical system or a nondefective/defective state of only the image-forming optical system.

8. The scanning optical system manufacturing method according to claim 1, wherein, the receiving receives the scanning beam in a state where a light-receiving surface of the light-receiving unit is arranged to be deviated in the optical axis direction with respect to an image plane position of the image-forming optical system by displacing the light receiving unit in the main scanning direction.

9. The scanning optical system manufacturing method according to claim 1, wherein the evaluation width is equal to or more than a half value of the shift amount of the scanning beam on the image surface of the image-forming optical system in the main scanning direction when the scanning beam from the deflecting device shifted as much as the width of the scanning beam at the optical surface of the image-forming optical system in the main scanning direction.

10. The scanning optical system manufacturing method according to claim 1, wherein the evaluation width is 3.3 mm or more and 6.6 mm or less.

11. A beam inspection apparatus comprising:
a light-receiving unit configured to receive a scanning beam emitted from a scanning unit including an incident optical system and a deflecting device and passed through an image-forming optical system, in an area having a light-receiving width in a main scanning direction narrower than a spot diameter of the scanning beam, and configure to be capable of being displaced in the main scanning direction; and a calculation unit configured to perform calculation processing for calculating, based on the output of the light-receiving unit, a peak light quantity at each image height position of the scanning beam, smoothing processing for smoothing, using an evaluation width in the main scanning direction, distribution data of the peak light quantity at each of the image height position acquired by the calculating, and inspection processing of determining, based on the data acquired by the smoothing processing, either nondefective/defective states of the scanning unit and the image-forming optical system or a nondefective/defective state of only the image-forming optical system, wherein the evaluation width is equal to or less than a shift amount of scanning beam on an image surface of the image-forming optical system in the main scanning direction when the scanning from the deflecting device shifted as much as a width of the scanning beam at an optical surface of the image-forming optical system in the main scanning direction.

12. The beam inspection apparatus according to claim 11, wherein the smoothing using the evaluation width in the main scanning direction includes acquiring a moving average of the distribution data of the peak light quantity.

13. The beam inspection apparatus according to claim 11, wherein the smoothing includes approximating the distribution data of the peak light quantity by a function having a second or higher order with the evaluation width at each of the image height position.

14. The beam inspection apparatus according to claim 11, wherein the determining differentiates the data acquired by the smoothing to acquire peak light quantity variation at each of the image height positions, and determines, based on the peak light quantity variation, either nondefective/defective states of the scanning unit and the image-forming optical system or a nondefective/defective state of only the image-forming optical system.

15. The beam inspection apparatus according to claim 11, wherein the determining provides a maximum amplitude standard for the data acquired by the smoothing, and determines, based on the maximum amplitude standard, either nondefective/defective states of the scanning unit and the image-forming optical system or a nondefective/defective state of only the image-forming optical system.

16. The beam inspection apparatus according to claim 11, wherein the determining determines, based on whether data exists out of a predetermined range in the data acquired by the smoothing, either nondefective/defective states of the scanning unit and the image-forming optical system or a nondefective/defective state of only the image-forming optical system.

17. The beam inspection apparatus according to claim 11, wherein the determining determines, based on whether a difference between maximum and minimum values with the evaluation width at each of the image height position is included in a predetermined range in the data acquired by the smoothing, either nondefective/defective states of the scanning unit and the image-forming optical system or a nondefective/defective state of only the image-forming optical system.

18. The beam inspection apparatus according to claim 11, wherein, the receiving receives the scanning beam in a state where a light-receiving surface of the light-receiving unit is arranged to be deviated in the optical axis direction with respect to an image plane position of the image-forming optical system by displacing the light receiving unit in the main scanning direction.

19. The beam inspection apparatus according to claim 11, wherein the evaluation width is equal to or more than a half value of the shift amount of the scanning beam on an image surface of the image-forming optical system in the main scanning direction when the scanning beam from the deflecting device shifted as much as the width of the scanning beam at the optical surface of the image-forming optical system in the main scanning direction.

20. The beam inspection apparatus according to claim 11, wherein the evaluation width is 3.3 mm or more and 6.6 mm or less.

* * * * *